(12) United States Patent
An

(10) Patent No.: US 10,314,097 B2
(45) Date of Patent: Jun. 4, 2019

(54) METHOD OF CONNECTING MULTIPLE APPARATUSES USING LOW-POWER BLUETOOTH

(71) Applicant: ABOV Semiconductor Co., Ltd., Chungcheongbuk-do (KR)

(72) Inventor: Yongchul An, Gyeonggi-do (KR)

(73) Assignee: ABOV Semiconductor Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 15/901,542

(22) Filed: Feb. 21, 2018

(65) Prior Publication Data

US 2018/0255598 A1 Sep. 6, 2018

(30) Foreign Application Priority Data

Mar. 2, 2017 (KR) .................. 10-2017-0027133

(51) Int. Cl.
*H04W 76/15* (2018.01)
*H04W 60/00* (2009.01)
*H04W 4/80* (2018.01)

(52) U.S. Cl.
CPC ............. *H04W 76/15* (2018.02); *H04W 4/80* (2018.02); *H04W 60/005* (2013.01); *Y02D 70/00* (2018.01); *Y02D 70/10* (2018.01); *Y02D 70/14* (2018.01); *Y02D 70/144* (2018.01)

(58) Field of Classification Search
CPC ..... H04W 76/15; H04W 4/80; H04W 60/005; H04W 76/10; H04W 76/14; H04B 3/544; H04B 7/18558; H04B 7/18539; H04B 2201/71346
See application file for complete search history.

(56) References Cited

U.S. PATENT DOCUMENTS

| 9,363,010 | B2* | 6/2016 | Lee ....................... H04W 76/14 |
| 2001/0000194 | A1* | 4/2001 | Sequeira ............... G06F 9/4881 |
| | | | 725/39 |
| 2012/0310669 | A1* | 12/2012 | Carlberg ................ G16H 10/60 |
| | | | 705/3 |
| 2014/0056220 | A1* | 2/2014 | Poitau ................... H04W 76/14 |
| | | | 370/328 |
| 2014/0297913 | A1* | 10/2014 | Odenbreit ......... H04L 12/40202 |
| | | | 710/110 |

(Continued)

FOREIGN PATENT DOCUMENTS

| KR | 1020090124588 | 12/2009 |
| KR | 101543163 | 8/2015 |

(Continued)

*Primary Examiner* — Andrew Wendell
(74) *Attorney, Agent, or Firm* — IP & T Group LLP

(57) ABSTRACT

Disclosed is a method of connecting a plurality of apparatuses using low-power Bluetooth. A plurality of slave apparatuses are connected to a master apparatus, and various signals or times are assigned to a time schedule table. In other words, a scan period, a window scanning time, a registration period, a registration signal, a general period, and a general signal are assigned to the time schedule table without being assigned to the same position of the time schedule table. More specifically, the slave apparatuses are connected to the master apparatus through a scheme of preventing start time points to which the signals are assigned from being assigned to the same position.

8 Claims, 14 Drawing Sheets

(56) References Cited

U.S. PATENT DOCUMENTS

2015/0249515 A1\* 9/2015 Wu ................... H04L 12/2801
370/442

FOREIGN PATENT DOCUMENTS

| KR | 101560697 | 10/2015 |
| KR | 1020150128357 | 11/2015 |
| KR | 101583925 | 1/2016 |

\* cited by examiner

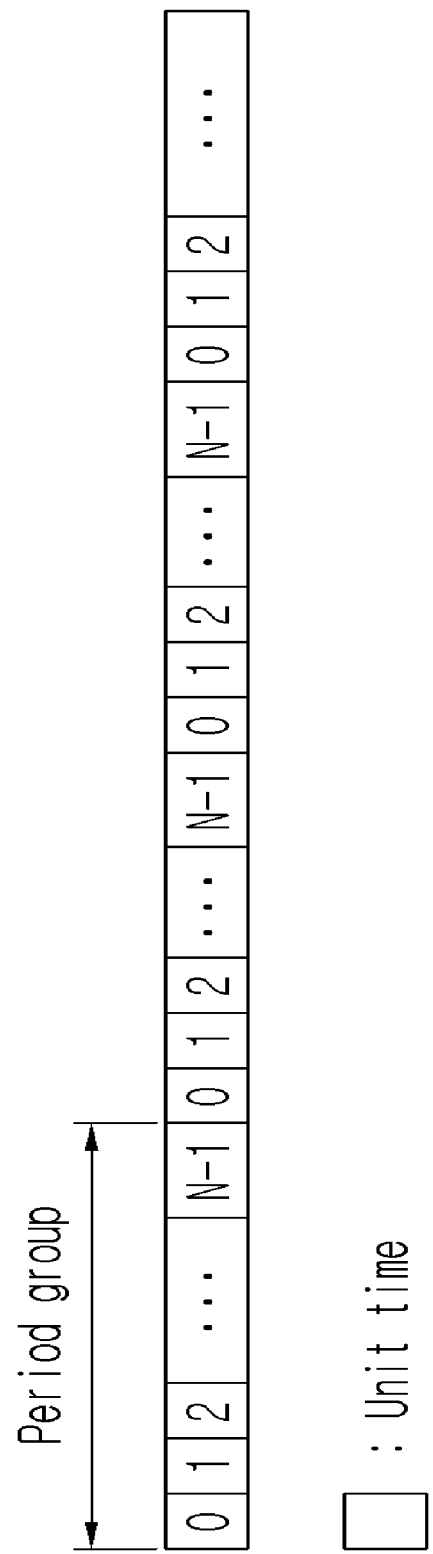

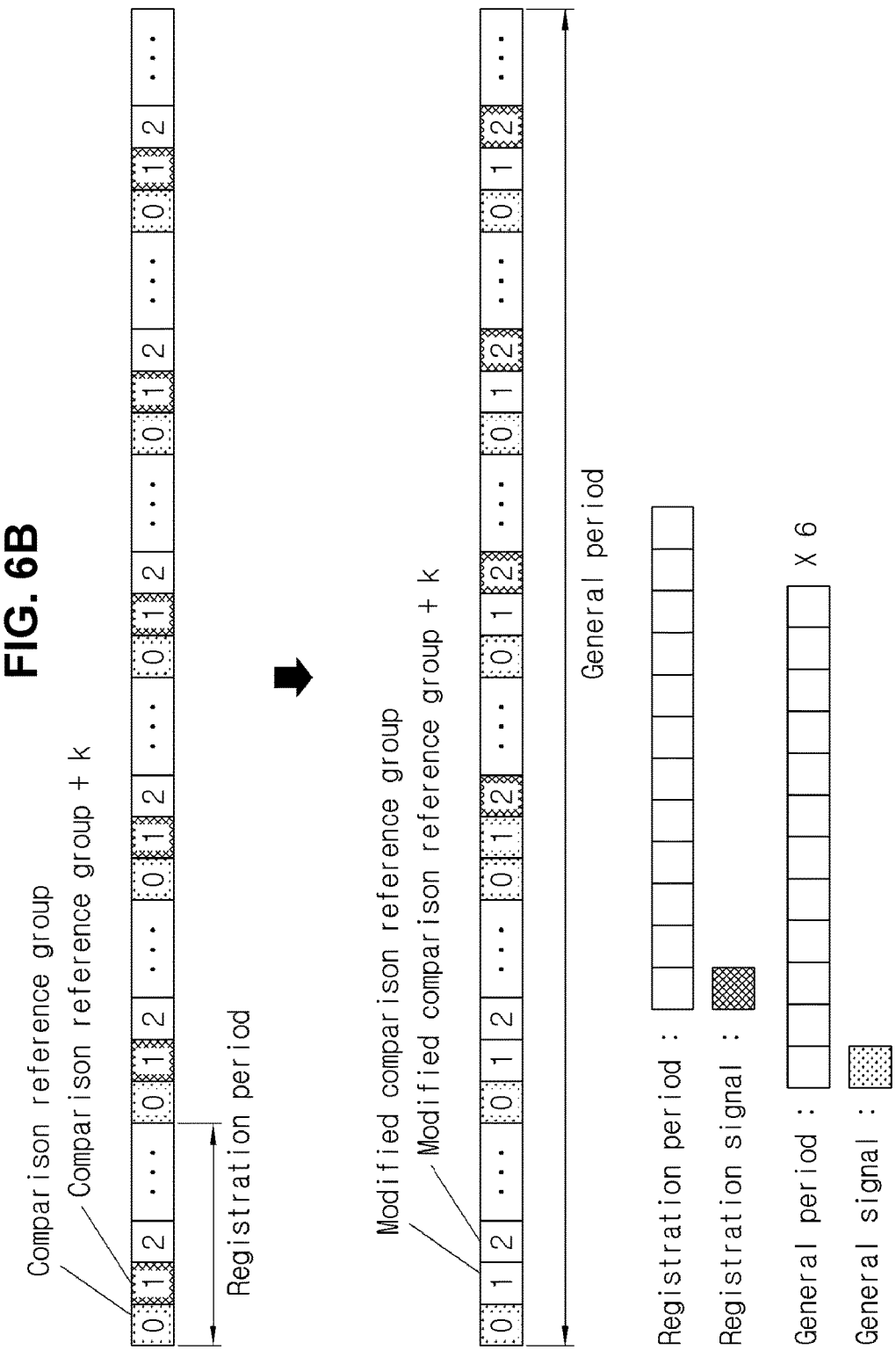

METHOD OF CONNECTING MULTIPLE APPARATUSES USING LOW-POWER BLUETOOTH

CROSS-REFERENCE TO RELATED APPLICATIONS

This application claims priority under 35 U.S.C. § 119 to Korean Patent Application No. 10-2017-0027133 filed on Mar. 2, 2017, the disclosure of which is herein incorporated by reference in its entirety.

BACKGROUND OF THE INVENTION

Field of the Invention

The present technique relates to a low-power Bluetooth connection method capable of connecting a plurality of slave apparatuses to one master apparatus.

In particular, the present technique relates to a method of connecting a plurality of apparatuses, capable connecting a plurality of slave apparatuses to one master apparatus such that a signal for performing a registration connection and a signal for performing a general connection are prevented from being simultaneously transceived.

Description of the Related Art

Low-power Bluetooth refers to a short-range wireless technology standard for allowing apparatuses to exchange information.

In the low-power Bluetooth, a master apparatus and a slave apparatus are paired with each other to exchange information, and one master apparatus may be connected to a plurality of slave apparatuses.

A process of connecting the master apparatus to the slave apparatus is performed in an order of a scan step, a connection request step, a registration connection step, and a general connection step.

In the scan step, the connection request step, the registration connection step, and the general connection step, signals are transceived at predetermined periods.

For example, in the scan step, the master apparatus receives a signal for 2.5 msec at a period of 7.5 msec.

The scan step is a step of receiving, by the master apparatus, an advertisement packet during a predetermined window scanning time at a predetermined scan period, when the slave apparatus transmits the advertisement packet including an address of the slave apparatus to the master apparatus. Accordingly, the master apparatus may detect a connectable slave apparatus.

The connection request step is a step of receiving the advertisement packet and attempting to connect to the slave apparatus which is detected as connectable one. In other words, the master apparatus transmits a connection packet to the slave apparatus to attempt connection.

The connection packet includes a start time point for attempting connection, a connection period, and a waiting timer. In other words, the connection packet includes information on a time for transmitting the connection packet, a period for transmitting the connection packet, and a common waiting timer value of the master apparatus and the slave apparatus which are connected to each other in a Bluetooth connection.

The master apparatus and the slave apparatus reset the waiting timer when one of the master apparatus and the slave apparatus receive a meaningful packet from the remaining one of the master apparatus and the slave apparatus. When the wait timer is terminated, the Bluetooth connection is regarded as being disconnected.

When the master apparatus and the slave apparatus are connected to each other through the connection request step, the registration connection step for fast data transmission and reception is performed, and when the registration connection step is completed, the general connection step is performed to transceive general data.

Through the general connection step, the master apparatus and the slave apparatus are finally connected to each other to transceive data.

In the above connection process, a great problem in the process of connecting one master apparatus to a plurality of slave apparatuses is simultaneously transceived various signals. In other words, when signals are simultaneously transceived in the process of connecting the master apparatus to the slave apparatus, the master apparatus may be disconnected from a slave apparatus which is under the connection process, or a slave apparatus which has been connected to the master apparatus.

DOCUMENT OF RELATED ART

Patent Document (Patent Document 0001) Korean Patent Registration No. 10-1583925, titled "METHOD FOR CONTROLLING BLUETOOTH CONNECTION"
(Patent Document 0002) Korean Patent Registration No. 10-1543163, titled "METHOD FOR CONTROLLING BLUETOOTH CONNECTION"

SUMMARY OF THE INVENTION

An object of the present invention is to provide a method of connecting a plurality of apparatuses using low-power Bluetooth, in which signals are prevented from being simultaneously transceived when a master apparatus and a slave apparatus are connected to each other by sequentially performing a scan step, a connection request step, a registration connection step, and a general connection step, so that a plurality of slave apparatuses may be stably connected to one master apparatus.

According to the present invention, the method of connecting the apparatuses using the low-power Bluetooth includes: a time schedule table forming step of setting a unit time for maintaining a connection event in which a master apparatus is connected to a slave apparatus, setting a registration period as a predetermined multiple of the unit time, setting a general period as a predetermined multiple of the registration period, performing a modular operation on a time based on the general period and performing a modular operation on the time based on the registration period to arrange the time by grouping the time; a scan step of assigning, to a time schedule table, a window scanning time in which the master apparatus receives an advertisement packet at a scan period, which is set as a predetermined multiple of the unit time, to receive the advertisement packet transmitted from the slave apparatus; a connection request step of transmitting a connection packet to the slave apparatus if the master apparatus receives the advertisement packet during the window scanning time to connect the master apparatus to the slave apparatus, which is detected as a connectable one; a registration connection step of assigning a registration signal to a predetermined group at the registration period, which is set as a predetermined multiple of the unit time, to transmit and receive the registration signal only during the group to which the registration signal is assigned to allow the slave apparatus, which is detected to be connectable to the master apparatus, to be registration-connected to the master apparatus for data transmission and reception; and a general connection step of repeatedly transceiving a general signal during a group other than a group to which at least the registration signal is assigned at the general period, which is set as a predetermined multiple of the unit time, to switch a connection state to a general connection in which the master apparatus and the slave apparatus, which are registration-connected to each other, transceive data with each other at a predetermined period.

In addition, in the scan step, the master apparatus may assign the window scanning time by setting an arbitrary group as a scan start time point if the window scanning time is not preassigned to a group constituting the time schedule table, and if the window scanning time is preassigned to the group constituting the time schedule table, the master apparatus may assign the window scanning time to a group present after the scan period is passed from the group to which the window scanning time is preassigned.

In addition, when other signal is assigned to the group present after the scan period is passed despite the master apparatus attempts to assign the window scanning time to the group present after the scan period is passed from the group to which the window scanning time is preassigned due to presence of the preassigned window scanning time, the master apparatus may regard that no preassigned window scanning time exists.

In addition, in the time schedule table formed in the time schedule table forming step, period groups at least not greater than a value obtained by dividing the general period by the registration period may be repeatedly arranged, one group among the period groups may be set as a comparison reference group, and the registration signal may not be assigned to at least the comparison reference group in the registration connection step.

In addition, the group to which the registration signal is assigned may be a group obtained by adding a predetermined constant K to the comparison reference group.

In addition, the general signal may be assigned to the comparison reference group.

In addition, the general signal may be assigned to the comparison reference group in an order of a connection sequence if the master apparatus is connected to a plurality of slave apparatuses.

In addition, a modified comparison reference group obtained by modifying the comparison reference group may be set when the general signal is assigned to all of a plurality of comparison reference groups.

The present invention can control time points at which signals are transceived in each step such that the time points are not set at an identical time by performing the above-described steps in a time series while assigning each signal to the time schedule table.

Therefore, a plurality of slave apparatuses can be connected to one master apparatus.

BRIEF DESCRIPTION OF THE DRAWINGS

FIG. 2A shows a time schedule table formed in a time schedule table forming step.

FIG. 6B is a view showing a case in which the comparison reference group is changed to a modified comparison reference group according to FIG. 6A.

DETAILED DESCRIPTION OF THE INVENTION

Before explaining the present invention in detail, terms to be used in a scan step S2, a connection request step S3, a registration connection step S4, and a general connection step S5 will be defined.

The scan step S2 includes a scan period, a window scanning time, and a scan start time point. The connection request step S3 includes the scan period and the window scanning time, which are the same as the scan period and the window scanning time in the scan step, and simultaneously includes a connection request start time point. The registration connection step S4 includes a registration period, a registration signal, and a registration connection start time point, and the general connection step S5 includes a general period, a general signal, and a general connection start time point.

In this case, the periods in each step indicate a length of a predetermined time for transceiving a signal, a window indicates a packet including data to be transceived, and a start time point indicates a unit length of a time at which each signal is initially transceived.

In addition, the window scanning time indicates a time for receiving an advertisement packet transmitted from the slave apparatus to the master apparatus.

For example, when the scan period is 3 msec, the window scanning time is 1 msec, and a current time is 0 sec in the scan step S2, if the window scanning time is assigned to a portion corresponding to 1 msec based on a time schedule table, which will be described below, 1 msec is the scan start time point, and the window scanning time is assigned to a portion corresponding to 4 msec to 5 msec, which is 3 msec after 1 msec based on the time schedule table.

Figure 1:
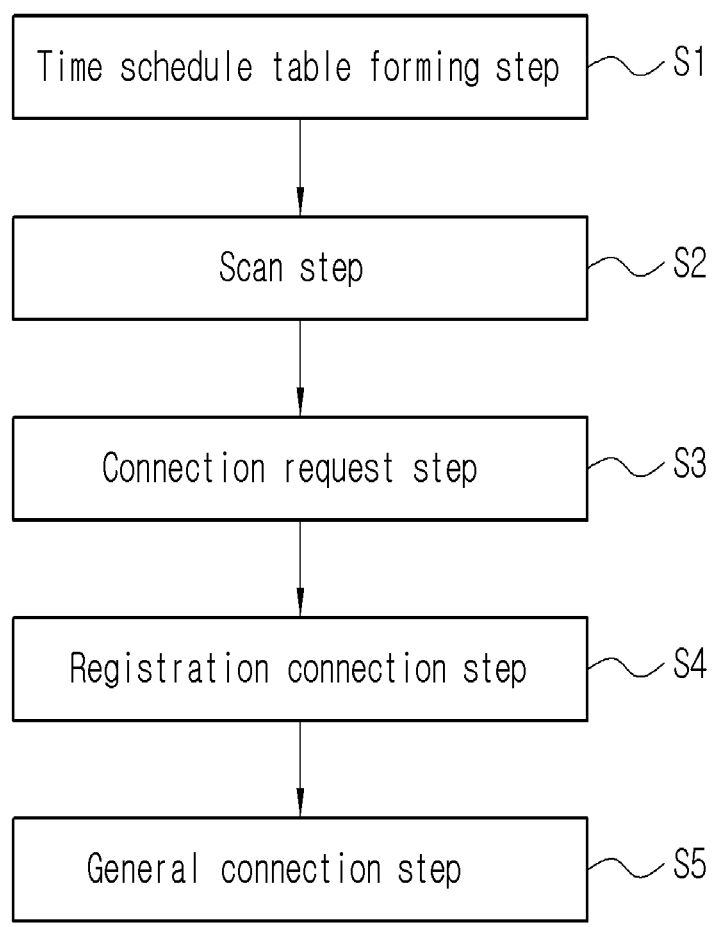
FIG. 1 is a block diagram showing a method of connecting a plurality of apparatuses using low-power Bluetooth according to the present invention.

FIG. 1 is a block diagram showing a method of connecting a plurality of apparatuses using low-power Bluetooth according to the present invention.

Figure 2B:
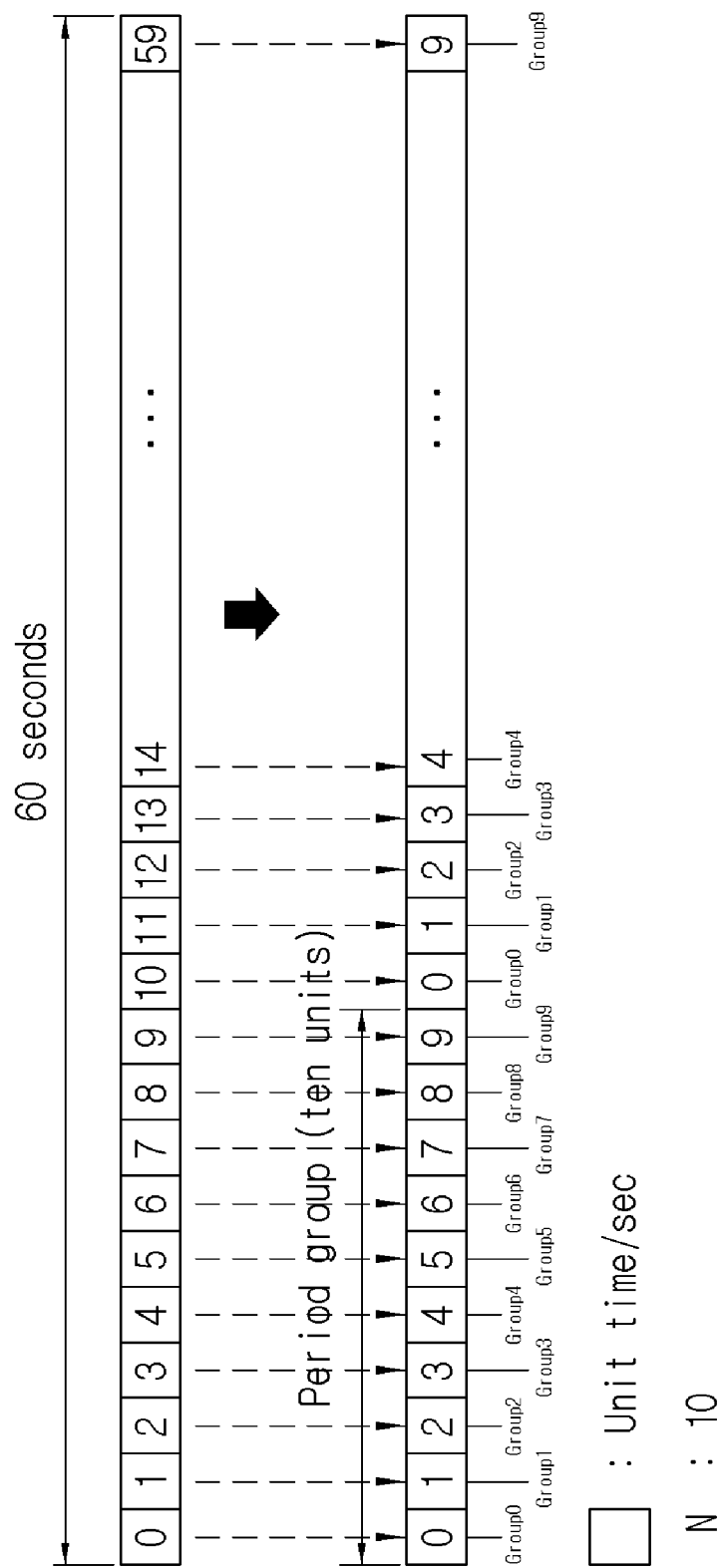
FIG. 2B shows a specific example of the time schedule table.

FIG. 2A shows the time schedule table formed in a time schedule table forming step S1, and FIG. 2B shows a specific example of the time schedule table.

According to the present invention, a plurality of slave apparatuses are connected to one master apparatus by assigning each signal to the time schedule table.

In the present invention, each step is operated on the basis of a unit time. The unit time indicates a piece of time, which is obtained by uniformly dividing a time.

The unit time is implemented through a concept of a reservation bandwidth.

In the scan step S2, which will be described below, the window scanning time uses a scanning reservation bandwidth. In the connection request step S3, a value obtained by adding the window scanning time to a connection packet is used as a connection request reservation bandwidth.

In a registration connection process or a general connection process, a time during which a connection event can be maintained at a maximum level is used as a connection reservation bandwidth. In other words, in the present invention, the unit time is set as the connection reservation bandwidth.

For example, when one second is uniformly divided by 0.1 second, 0.1 second is the unit time.

The time schedule table in the present invention is formed by setting the registration period as a predetermined multiple of the unit time, setting the general period as a predetermined multiple of the registration period, performing a modular operation based on the general period, and performing a modular operation based on the registration period.

In this case, the registration period will be referred to as M (M is a natural number), and the general period will be referred to as N (N is a natural number).

Hereinafter, the embodiments will be described by setting the unit time as an exaggerated time (in seconds) for convenience of understanding. In addition, a time uniformly divided by the unit time will be referred to as a group.

For example, when the unit time is 1 second, M=10, and N=60, a time of 60 seconds will be uniformly divided by 1 second, which is the unit time.

Then, when the modular operation is performed based on N, groups 0 to 59 is repeated by a plurality of times in the time of 60 seconds. In other words, the groups 0 to 59 are repeated continuously. When one of the repeated groups 0 to 59 is examined, the groups 0 to 59 are uniformly divided by the unit time, so that the groups 0 to 59 may be divided into 60 groups in total. Since M=10, M may be repeated 6 times for the groups 0 to 59. In other words, M may be repeated in the sequence of groups 0 to 9, groups 10 to 19, groups 20 to 29, groups 30 to 39, groups 40 to 49, and groups 50 to 59.

In this case, the modular operation may be performed on the groups 0 to 59 based on M.

When the modular operation is performed based on M, a period group obtained by grouping 10 groups, which are the groups 0 to 9, may be repeated 6 times.

In other words, since M is 10, the groups 0 to 9 constitute one period group including 10 groups, and the period group will be repeated 6 times in the groups 0 to 59.

In other words, in a time from 0 to 59 seconds, when 0 second is subject to the modular operation based on 10, an obtained result value is 0, when 1 second is subject to the modular operation based on 10, an obtained result value is 1, when 2 seconds are subject to the modular operation based on 10, an obtained result value is 2, when 9 seconds are subject to the modular operation based on 10, an obtained result value is 9, when 10 seconds are subject to the modular operation based on 10, an obtained result value is 1, when 12 seconds are subject to the modular operation based on 10, an obtained result value is 2, and when 19 seconds are subject to the modular operation based on 10, an obtained result value is 9.

Therefore, the result values are summarized as follows.

The groups 0, 10, 20, 30, 40, and 50 become group 0, the groups 11, 21, 31, 41, and 51 become group 1, and the groups 12, 22, 32, 42, and 52 become group 2. By arranging the groups through the same scheme, the groups 9, 19, 29, 39, 49, and 59 finally become group 9.

In other words, the modular operation based on 10 results in repeated groups 0 to 9. The groups 0 to 9 may be named as one unit group, which is repeatedly arranged.

In other words, when 0 to 59 seconds are sequentially arranged in units of the unit time, a result is 0, 1, 2, 3, 4, 5, 6, 7, 8, 9, 10, 11, 12, 13, 14, 15, 16, 17, 18, 19, 20, and 21 to 59 seconds, which may be expressed as follows when being subject to the modular operation based on 10.

As described above, it is expressed as 0, 1, 2, 3, 4, 5, 6, 7, 8, 9, 0, 1, 2, 3, 4, 5, 6, 7, 8, 9, 0, 1, . . . , 9. In this case, the groups 0 to 9 form one unit group, and a party of 6 unit groups is formed up to 59 seconds.

For example, when 120 seconds are subject to the above process for convenience of understanding, groups 0 to 119 are divided into two groups, which are groups 0 to 59 and groups 0 to 59, and then each of the groups 0 to 59 constitute groups 0 to 9, groups 10 to 19, groups 20 to 29, groups 30 to 39, groups 40 to 49, and groups 50 to 59.

In general, when L seconds (L is a natural number) are subject to the above process, N−1 groups are grouped into one party that is repeated in the L seconds, and groups 0 to M−1 are repeated by N/M times in the party obtained by grouping the N−1 groups.

According to the present invention, signals are prevented from being simultaneously transceived through a scheme of assigning the signals to the time schedule table formed as described above.

The scan period, the window scanning time, the registration period, the registration signal, the general period, and the general signal described above are formed as predetermined multiples of the above-described unit time.

Hereinafter, for convenience of explanation, the low-power Bluetooth will be explained by assuming 1 sec, which is the exaggerated time, as the unit time as in the above-described time schedule table.

In the following description, unless otherwise stated, the unit time is 1 sec, M (registration period)=10, and N (general period)=60.

Figure 3A:
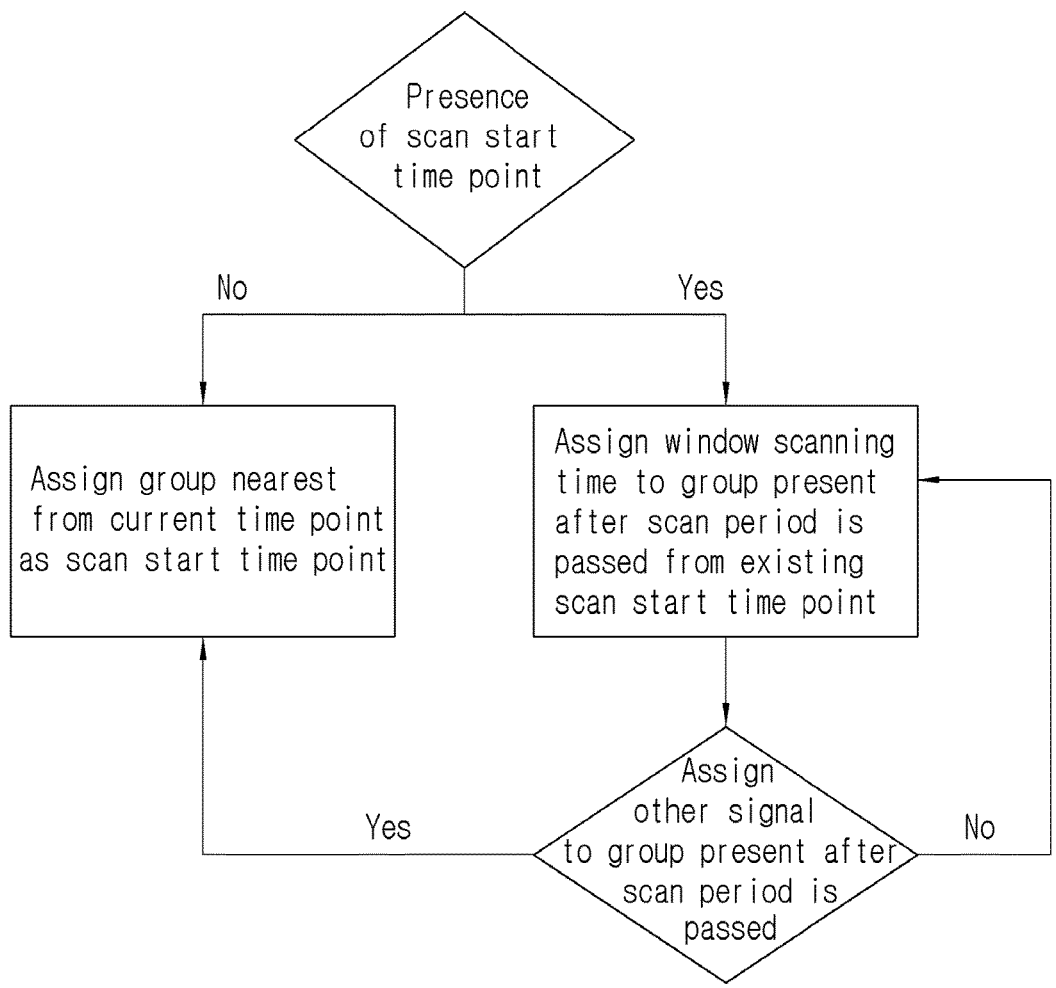
FIG. 3A is a block diagram showing an operation sequence of a scan step according to the present invention.
Figure 3B:
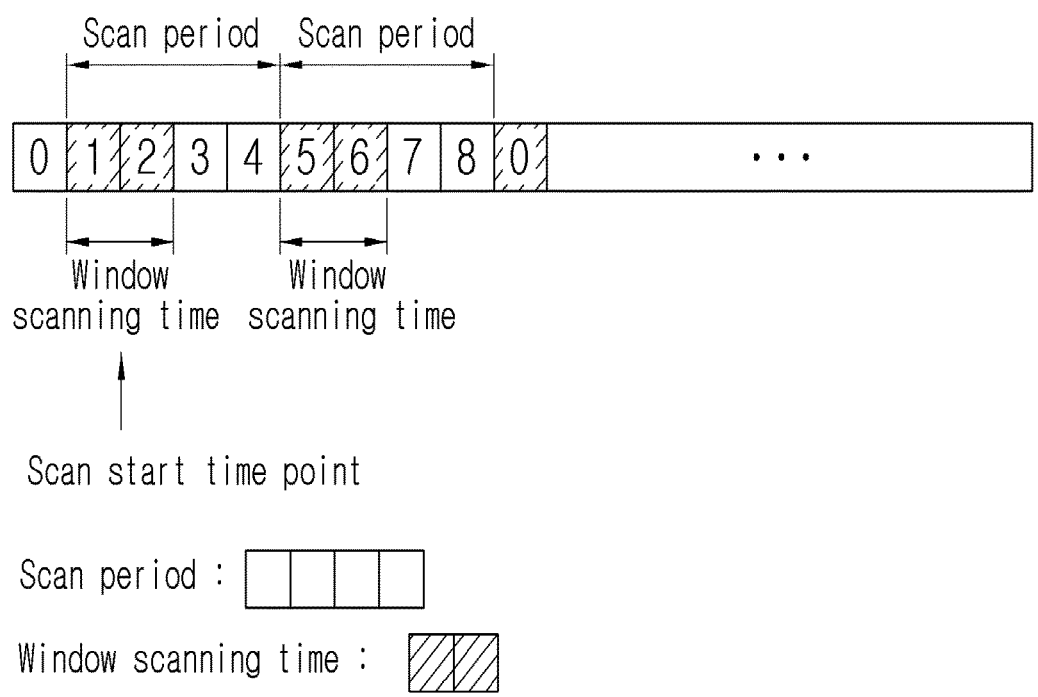
FIG. 3B is a view showing a window scanning time assigned to the time schedule table according to the block diagram of FIG. 3A.
Figure 3C:
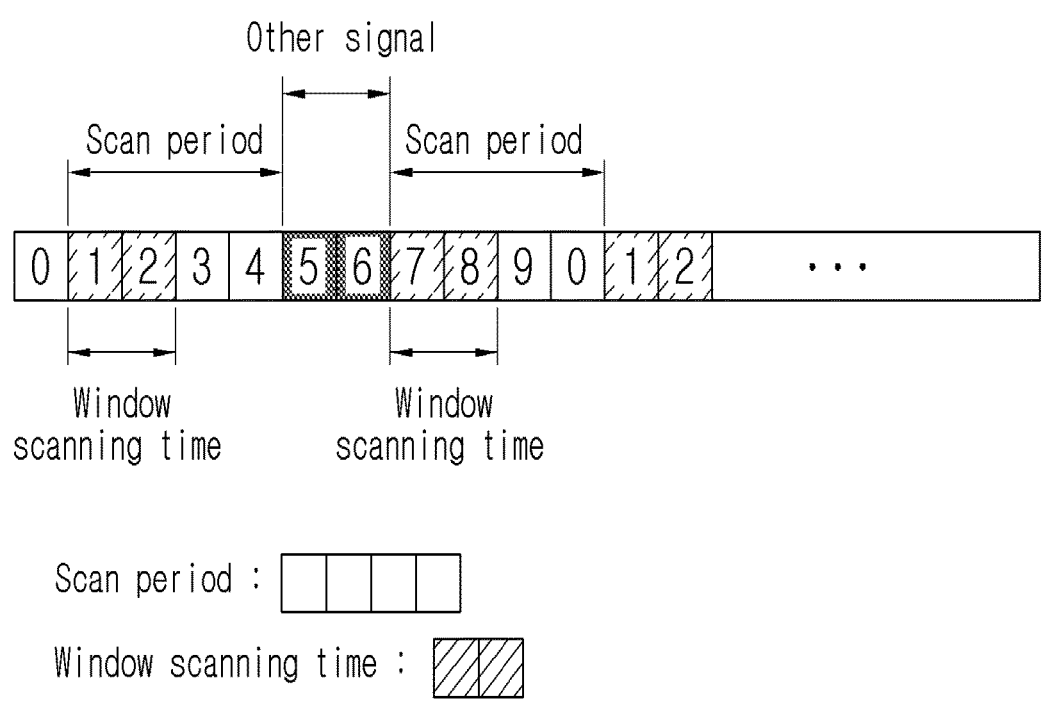
FIG. 3C is a view showing an operation when other signal is assigned to the time schedule table while assigning the window scanning time to the time schedule table in the scan step.

FIG. 3A is a block diagram showing an operation sequence of the scan step S2 according to the present invention, FIG. 3B is a view showing a window scanning time assigned to the time schedule table according to the block diagram of FIG. 3A, and FIG. 3C is a view showing an operation when other signal is assigned to the time schedule table while assigning the window scanning time to the time schedule table in the scan step S2.

In the scan step S2, the advertisement packet, which is transmitted from a connectable slave apparatus during the window scanning time at the scan period in order to allow the master apparatus to detect the connectable slave apparatus, is received.

For convenience of explanation, it is assumed that the scan period is 4 sec, and the window scanning time for receiving the advertisement packet is 2 sec. When the scan period and the window scanning time are assigned to the time schedule table, the scan period may be assigned to four groups, and the window scanning time may be assigned to two groups.

In the scan step S2, a scheme of assigning data to the time schedule table may vary depending on the presence of the scan start time point.

If the scan start time point does not exist, a scheme of sequentially assigning data to the nearest group of the time schedule table based on the current time point is used.

In other words, referring to FIG. 3B, when the current time point is 1 sec, and the scan start time point does not exist, the master apparatus assigns the scan period to the groups 1 to 4, and assigns the window scanning time to the groups 1 and 2 to receive the advertisement packet.

Thereafter, since the scan start time point exists, the master apparatus assigns the window scanning time to a position where the scan period is passed from the scan start time point, that is, a position where the scan period is added to receive the advertisement packet again.

In other words, referring to FIG. 3B, the scan period, which is 4 sec, is added to the group 1, which is the scan start time point, the scan period is assigned to the groups 5 to 8, and the window scanning time is assigned to the groups 5 to 6 to receive the advertisement packet transmitted from the slave apparatus.

In this manner, the scan step S2 is continuously maintained until the slave apparatus to which the master apparatus is connectable is detected.

In this case, if other signal is assigned to the position of the time schedule table to which the window scanning time is assigned, the other signal is given priority.

In other words, for example, when the registration signal is assigned to the group 5 in the case in which the scan start time point is assigned to the group 1, the scan period is assigned to the groups 5 to 8, and the window scanning time is to be assigned to the groups 5 to 6, the master apparatus regards that no scan start time point exists, and assigns the window scanning time to the nearest group based on the current time point.

In other words, the master apparatus assigns the scan period to the groups 6 to 0 by setting the group 6 as the scan start time point, and assigns window scanning time to the groups 6 and 7.

Thereafter, since the scan start time point exists, the master apparatus assigns the scan period and the window scanning time to the time schedule table in a scheme used in the case where the scan start time point exists as described above.

Figure 4A:
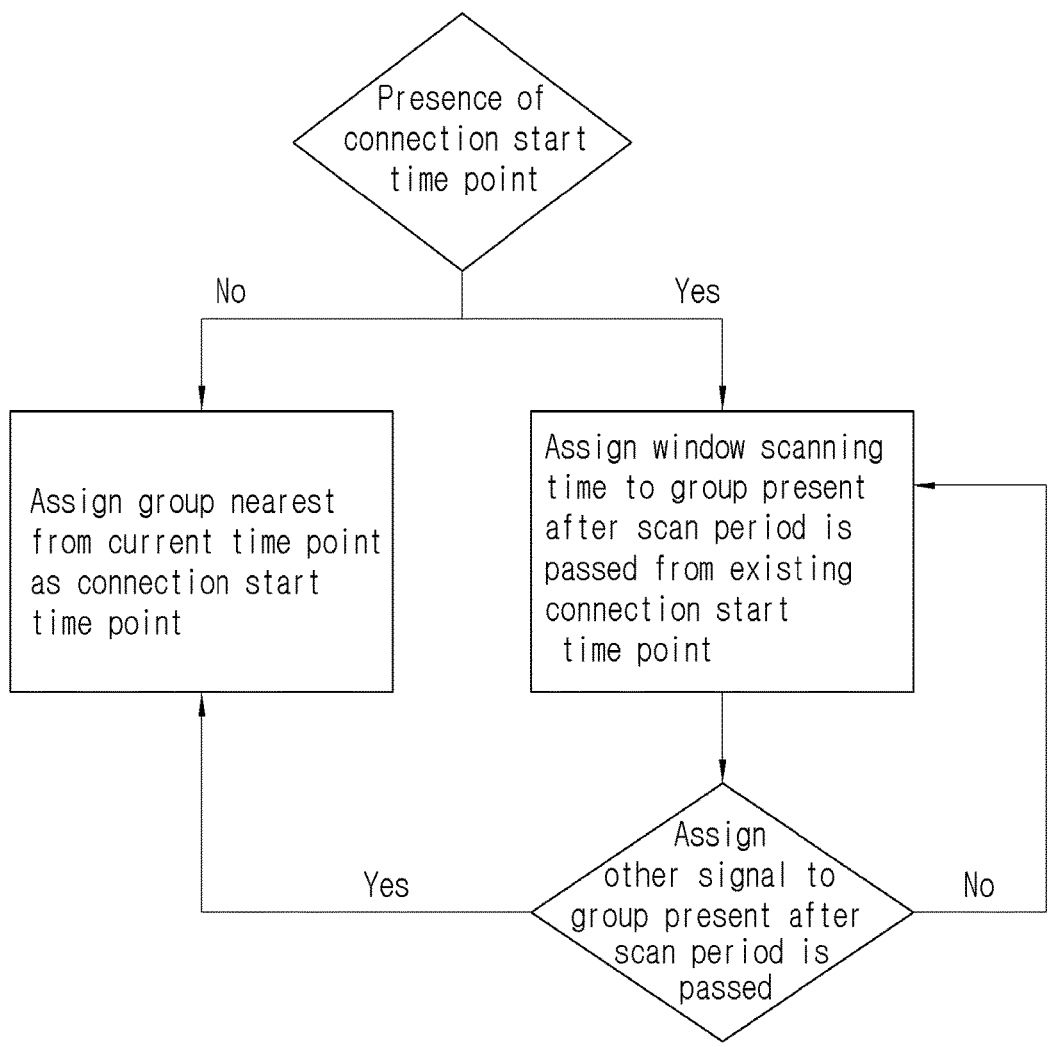
FIG. 4A is a block diagram showing an operation of a connection step according to the present invention.
Figure 4B:
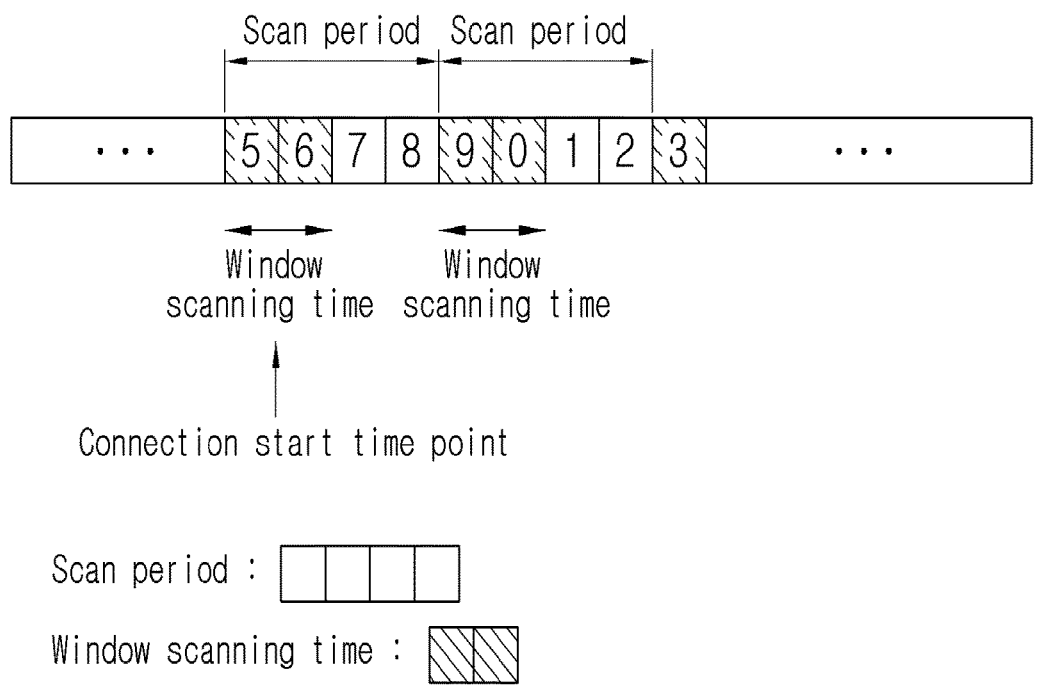
FIG. 4B is a view showing the window scanning time assigned to the time schedule table according to the block diagram of FIG. 4A.
Figure 4C:
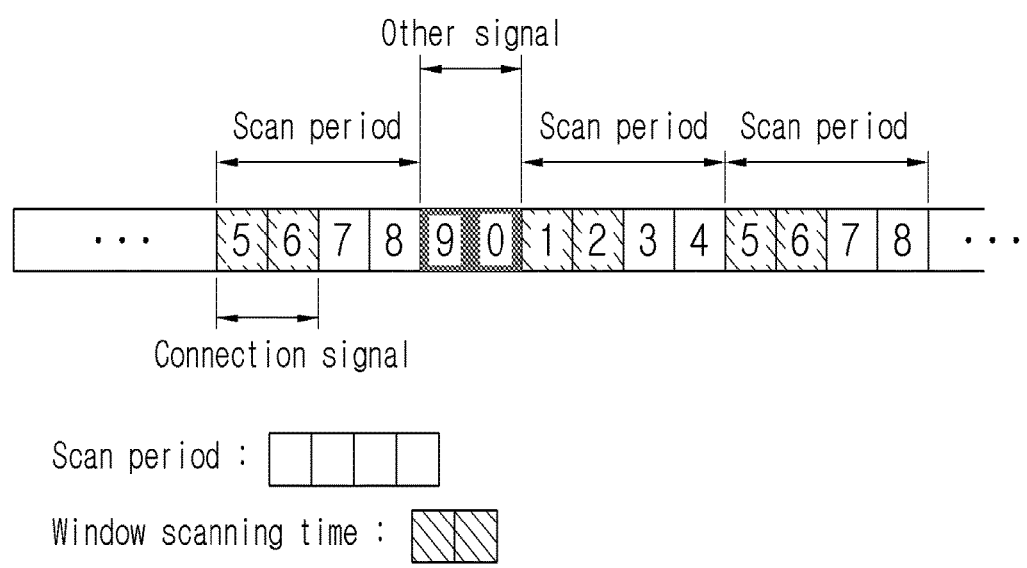
FIG. 4C is a view showing an operation when other signal is assigned to the time schedule table while assigning the window scanning time to the time schedule table in the connection step.

FIG. 4A is a block diagram showing an operation of a connection step according to the present invention, FIG. 4B is a view showing the window scanning time assigned to the time schedule table according to the block diagram of FIG. 4A, and FIG. 4C is a view showing an operation when other signal is assigned to the time schedule table while assigning the window scanning time to the time schedule table in the connection step.

The connection request step S3 is a step of transmitting a connection packet for connection to the slave apparatus when the advertisement packet is received during the window scanning time to connect the master apparatus to the slave apparatus, which is detected as connectable one.

In other words, the connection request step S3 is a step of transmitting the connection packet to the slave apparatus when the master apparatus receives the advertisement packet transmitted from the slave apparatus. Therefore, the connection request step S3 basically has the same operation structure as the scan step S2.

Hereinafter, it is assumed that the master apparatus has received the advertisement packet during the window scanning time in the connection request step S3 even if other description is not provided.

The connection request step S3 has the same process flow as the scan step S2.

In other words, in the connection request step S3, a scheme of assigning data to the time schedule table may vary depending on the presence of a connection start time point.

If the connection start time point does not exist, a scheme of sequentially assigning data to the nearest group of the time schedule table based on the current time point is used.

In other words, referring to FIG. 4B, when the current time point is 5 sec, and the connection start time point does not exist, the master apparatus assigns the scan period to the groups 5 to 8, and assigns the window scanning time to the groups 5 and 6 to transmit the connection packet to the slave apparatus.

Thereafter, since the connection start time point exists, the scan period is assigned again to a position where the scan period is passed, that is, a position where the scan period is added, and the window scanning time is assigned again.

In other words, the scan period is assigned from the group 9, which is obtained by adding the scan period to the group 5, to the group 2, and the window scanning time is assigned to the groups 9 and 0 to receive the advertisement packet.

By continuously repeating the above process, the master apparatus is connected to the slave apparatus.

In this case, when other signal is assigned to the group 9 and group 0 that is subsequent to the group 9, the connection request step S3 is set to perform the same operation as in the scan step S2.

If the registration signal is assigned to the groups 9 and 0, the assignment of the window scanning time is set to a lower priority, and it is regarded that no connection start time point exists.

Therefore, a group at a time closest to the current time point is regarded as the connection start time point. In other words, the registration period is assigned to the groups 1 to 4, and the registration signal is assigned to the groups 1 and 2. Then, the same operation is performed as in the case where the connection start time point exists.

Figure 5:
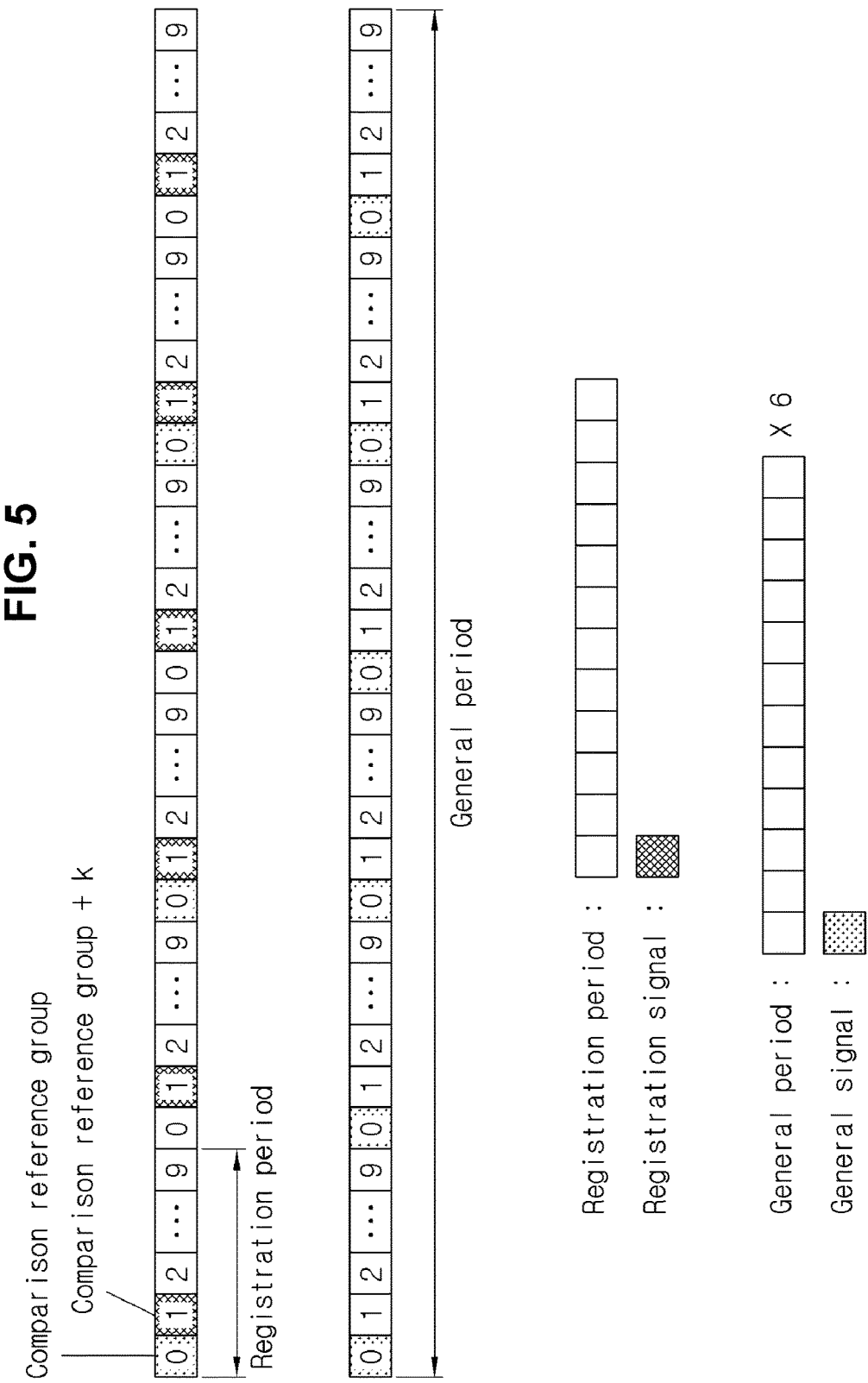
FIG. 5 shows a method of assigning a registration signal and a general signal to the time schedule table such that the registration signal and the general signal are not assigned to the same position of the time schedule table.

FIG. 5 shows a method of assigning a registration signal and a general signal to the time schedule table such that the registration signal and the general signal are not assigned to the same position of the time schedule table.

The registration connection step S4 is a connection step for allowing the master apparatus to transceive data with the slave apparatus, which is detected to be registration-connectable in the connection request step S3, at a fast period.

In this case, although not described above in the time schedule table forming step S1, a comparison reference group is set when the time schedule table is formed. The comparison reference group is a group to which at least the registration signal is not assigned.

Preferably, a group to which predetermined k (k is a natural number) is added to the comparison reference group becomes a group to which the registration signal is assigned.

For example, when the comparison reference group is the group 0, and k is 1, the registration signal is assigned to only the group 1. In this case, assuming that the registration period is 10 sec, and the master apparatus and the slave apparatus transceive the registration signal with each other for 1 sec, as shown in FIG. 5, the master apparatus and the slave apparatus transceive data (registration signal) with each other in the group 1 located at the foremost position. Then, in the group 1 located after passing 10 groups, the master apparatus and the slave apparatus transceive the registration signal with each other again. The registration connection is completed by repeating the above process at the registration period.

The general connection step S5 is a continuous connection step of transceiving the general signal at a period longer than that of the registration connection.

The general period is set as a predetermined multiple of the registration period, and the time schedule table is created based on the general period. For example, when the registration period is 10 sec, the general period is 60 sec, which is a predetermined multiple of the registration period.

The data is transceived between the master apparatus and the slave apparatus using the general signal. The general signal is assigned to the comparison reference group which is described above. For example, when the comparison reference group is the group 0, the general signal is continuously assigned to the group 0.

The master apparatus and the slave apparatus are connected to each other through the above steps. In other words, when the master apparatus and the slave apparatus are connected to each other through the above steps, one master apparatus is connected to one slave apparatus.

Figure 6A:
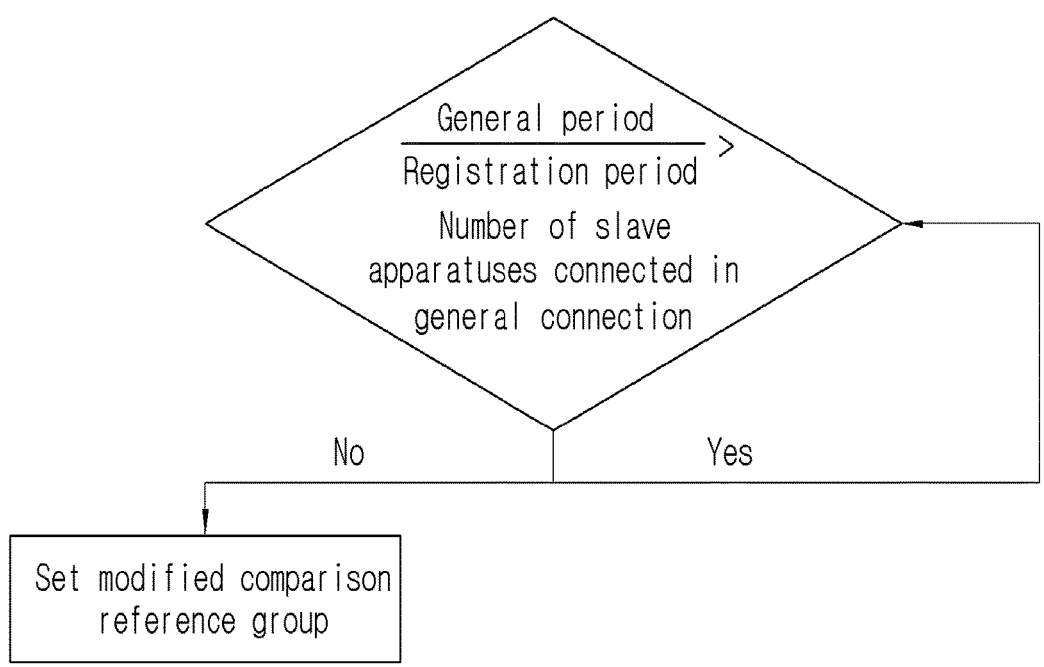
FIG. 6A is a block diagram showing an operation in which a comparison reference group is changed.

FIG. 6A is a block diagram showing an operation in which a comparison reference group is changed, and FIG. 6B is a view showing a case in which the comparison reference group is changed to a modified comparison reference group according to FIG. 6A.

When the slave apparatus is connected to the master apparatus in the general connection, the process starts again from the beginning in the scan step S2 while regarding that no start time points exist.

In this case, the general signal is assigned to the time schedule table in the nearest position at the time when the slave apparatuses connected to the master apparatus are sequentially switched from the registration connection to the general connection. At the same time, the master apparatus performs a comparison operation of continuously comparing division values obtained by dividing the general period by the registration period.

In other words, for example, when the general period is 60, and the registration period is 10, the division value is 6, which indicates that there are six comparison reference groups on the time schedule table. Therefore, six general connections are possible.

If the division value is the same as the number of the slave apparatuses connected in the general connection as a result of the comparison operation, the comparison reference group+1 is performed.

In other words, when five slave apparatuses are connected to one master apparatus in the general connection, five groups are assigned from six groups (group 0). In this case, if six slave apparatuses in total are connected to the master apparatus through the scan step S2, the general connection step S5, the registration connection step S4, and the general connection step S5, the master apparatus compares the division value of 6 with the number of connected slave apparatuses. When the division value and the number of the slave apparatuses connected to the master apparatus match with each other, the comparison reference group+1 is performed to set a modified comparison reference group.

Therefore, the group 1 becomes the comparison reference group. In addition, by applying the above process, the registration signal is assigned to the group 2, which is obtained by performing the comparison reference group+1.

In other words, when the slave apparatus connected to the master apparatus in the general connection is assigned corresponding to the division value, while the group 0 is regarded as not present, the scan step S2, the connection request step S3, the registration connection step S4, and the general connection step S5 are repeated based on the groups 1 to 9.

In this case, there are six groups (group 0). When 12 slave apparatuses in total are connected to the master apparatus, a re-modified comparison reference group is set by performing the modification comparison reference group+1.

Then, in the groups other than the groups 0 and 1, an additional connection is performed by repeating the scan step S2, the connection request step S3, the registration connection step S4, and the general connection step S5.

According to the above method as described above, in the present invention, even if a plurality of slave apparatuses are connected to one master apparatus, signals are not simultaneously transceived in each step. Therefore, the slave apparatuses can be stably connected to one master apparatus.

Figure 7A:
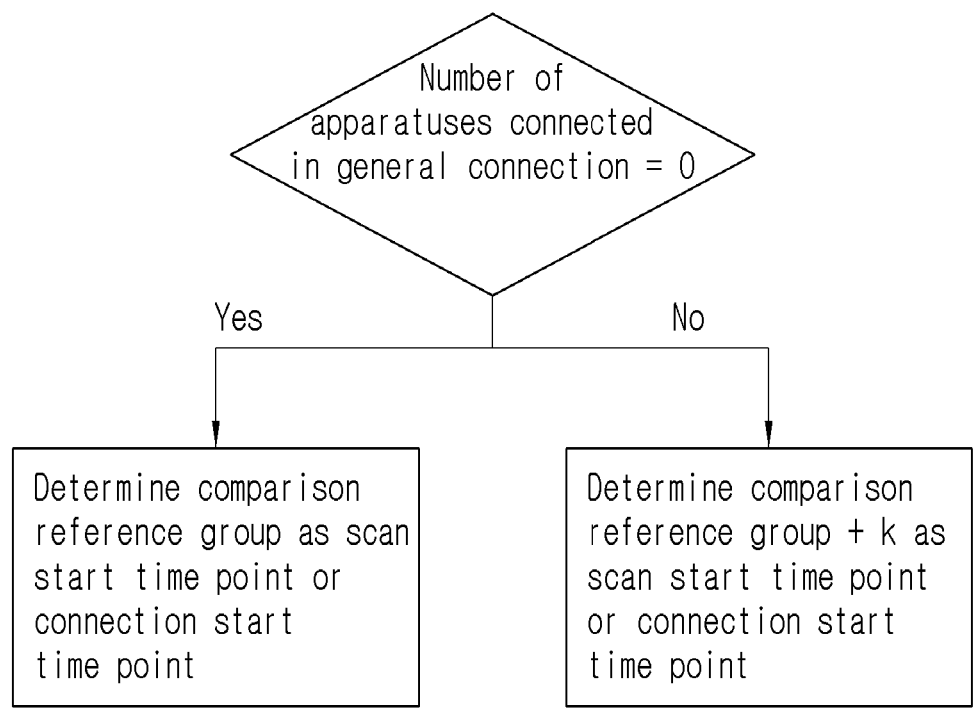
FIG. 7A is a block diagram showing a procedure of a scan step or a connection request step of a method of connecting a plurality of apparatuses using low-power Bluetooth according to another embodiment of the present invention.
Figure 7B:
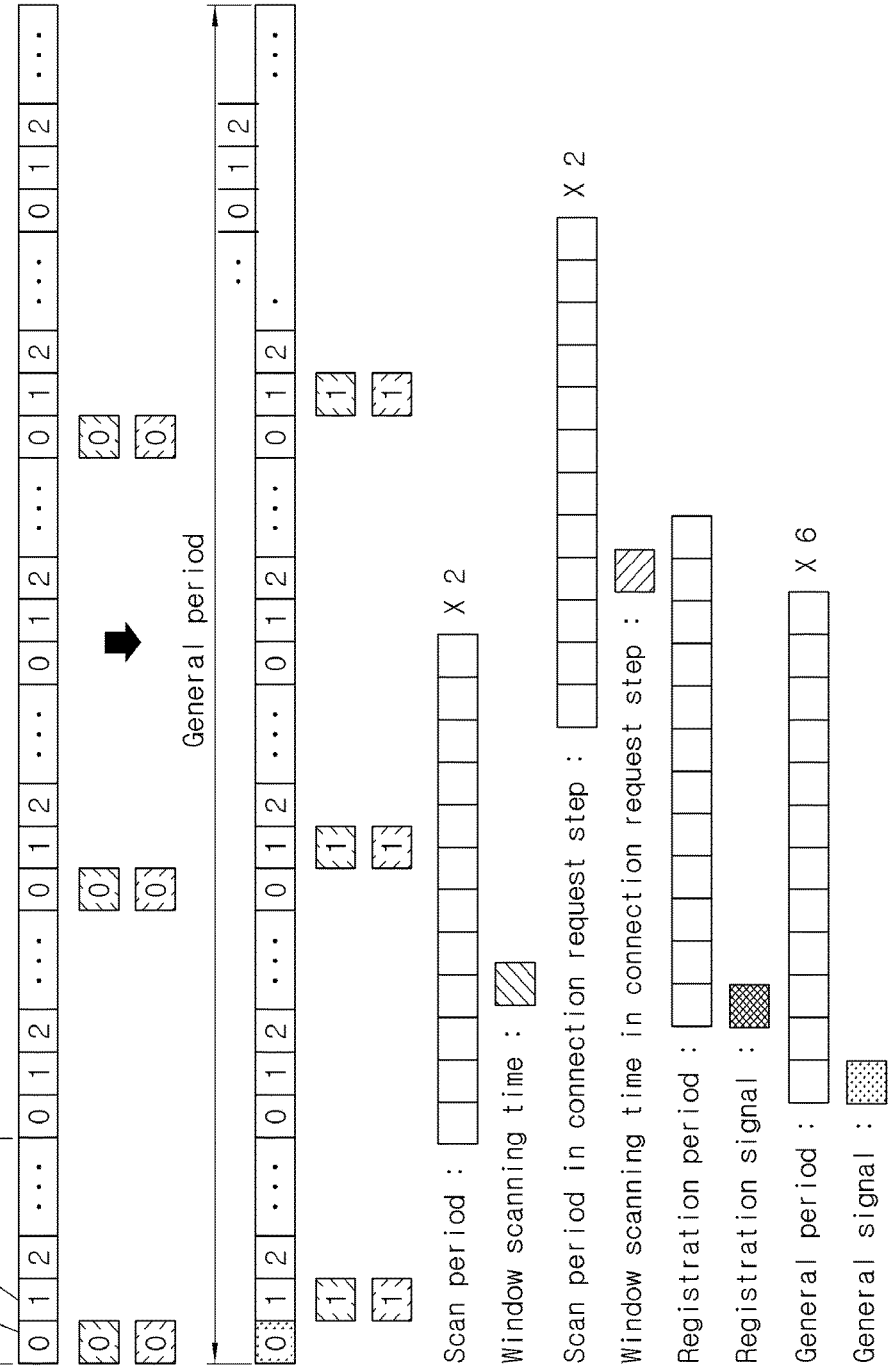
FIG. 7B shows an embodiment of FIG. 7A.

FIG. 7A is a block diagram showing a procedure of a scan step or a connection request step of a method of connecting a plurality of apparatuses using low-power Bluetooth according to another embodiment of the present invention, and FIG. 7B shows an embodiment of FIG. 7A.

Before explaining a method of connecting a plurality of apparatuses using low-power Bluetooth according to another embodiment of the present invention, for convenience of explanation, the window scanning time is set to allow the signal to be received or transmitted for the unit time as described above, whereas the window scanning time is assumed to be equal to the unit time, not the unit time×2.

In addition, it is assumed that the scan period is longer than the registration period.

The method of connecting the apparatuses using the low-power Bluetooth according to another embodiment, which is configured based on the above description, is performed through steps which are the same as in the above-described steps (see FIG. 1). However, there is a slight difference in a detailed part when performing each step.

If the scan period is longer than the registration period, a difference occurs in the time schedule table forming step S1. However, a reference point serving as a reference of the time schedule table is the registration period as in the above embodiment. In other words, similar to a case in which the general period is determined as a predetermined multiple of the registration period, the scan period is also determined as a predetermined multiple of the registration period.

According to another embodiment of the present invention, when assigning the scan start time point to the time schedule table S2 in the scan step, and assigning the connection start time point to the time schedule table in the connection request step S3, determination is made depending on the presence of the preassigned window scanning time as in the above embodiment, whereas a difference occurs in examining the presence of the general signal, which is performed before the determination.

If there is no slave apparatus connected to the master apparatus in the general connection, the scan start time point is continuously assigned to the comparison reference group, and the connection start time point is also continuously assigned to the comparison reference group in the connection request step S3 in which a connection with the slave apparatus detected as being connectable is attempted through the scan step.

In addition, if there is at least one slave apparatus connected to the master apparatus in the general connection, a group obtained by performing a comparison reference+k is determined as the scan start time point and the connection start time point, and the window scanning time is assigned to a group obtained by performing the comparison reference group+k. The above process is performed to prevent the general signal and the window scanning time from being assigned to the same group of the time schedule table.

In other words, referring to FIG. 7B, when the master apparatus and the slave apparatus are not connected to each other in the general connection, the window scanning time is assigned to the group 0. Then, when the general signal is assigned to the group 0, the window scanning time is assigned to the group 1, which is obtained by performing the group+1 (k is assumed to be 1) for reception of the advertisement packet or transmission of the connection packet. In this manner, the scan start time point and the connection start time point are determined.

If the general signal is assigned to all of the comparison reference groups, the scan start time point and the connection start time point are determined by performing the modified comparison reference group+k.

Although the present invention has been particularly shown and described with reference to specific embodiments thereof, it will be apparent to those skilled in the art that various changes and modifications can be made without departing from the spirit and scope of the present invention as defined by the following claims.

In addition, it is understood that the embodiments separately described above can be combined with each other without departing from the spirit and scope of the present invention.

What is claimed is:

1. A method of connecting a plurality of apparatuses using low-power Bluetooth, the method comprising:
   a time schedule table forming step, carried out by a master apparatus, of setting a unit time for maintaining a connection event in which the master apparatus is connected to a slave apparatus, setting a registration period as a predetermined multiple of the unit time, setting a general period as a predetermined multiple of the registration period, performing a modular operation on a time based on the general period and performing a modular operation on the time based on the registration period to arrange the time by grouping the time;
   a scan step, carried out by the master apparatus, of assigning, to a time schedule table, a window scanning time in which the master apparatus receives an advertisement packet with a scan period, which is set as a predetermined multiple of the unit time, to receive the advertisement packet transmitted from the slave apparatus;
   a connection request step, carried out by the master apparatus, of transmitting a connection packet to the slave apparatus if the master apparatus receives the advertisement packet during the window scanning time to connect the master apparatus to the slave apparatus, which is detected as a connectable one;
   a registration connection step, carried out by the master apparatus, of transceiving data for registration with the registration period only during a predetermined group to allow the slave apparatus, which is detected to be connectable to the master apparatus, to be registration-connected to the master apparatus for data transmission and reception; and
   a general connection step, carried out by the master apparatus, of repeatedly transceiving data for general connection during a group other than a group during which at least the data for registration is transceived with the general period, to switch a connection state to a general connection in which the master apparatus and the slave apparatus, which are registration-connected to each other, transceive data with each other with a predetermined period.

2. The method of claim 1, wherein in the scan step, the master apparatus assigns the window scanning time by setting an arbitrary group as a scan start time point if the window scanning time is not preassigned to a group constituting the time schedule table, and if the window scanning time is preassigned to the group constituting the time schedule table, the master apparatus assigns the window scanning time to a group present after the scan period is passed from the group to which the window scanning time is preassigned.

3. The method of claim 2, wherein when other data is assigned to the group present after the scan period is passed despite the master apparatus attempts to assign the window scanning time to the group present after the scan period is passed from the group to which the window scanning time is preassigned due to presence of the preassigned window scanning time, the master apparatus regards that no preassigned window scanning time exists.

4. The method of claim 1, wherein in the time schedule table formed in the time schedule table forming step, period groups at least not greater than a value obtained by dividing the general period by the registration period are repeatedly arranged, one group among the period groups is set as a comparison reference group, and the data for registration is not assigned to at least the comparison reference group in the registration connection step.

5. The method of claim 4, wherein the group during which the data for registration is transceived is a group obtained by adding a predetermined constant K to the comparison reference group.

6. The method of claim 4, wherein the data for general connection is assigned to the comparison reference group.

7. The method of claim 4, wherein the data for general connection is assigned to the comparison reference group in an order of a connection sequence if the master apparatus is connected to a plurality of slave apparatuses.

8. The method of claim 7, wherein a modified comparison reference group obtained by modifying the comparison reference group is set when the data for general connection is assigned to all of a plurality of comparison reference groups.

* * * * *